Feb. 26, 1952     A. J. HANSEN     2,587,151
PROTECTIVE SYSTEM FOR ELECTRONIC FREQUENCY CHANGERS
Filed March 22, 1950
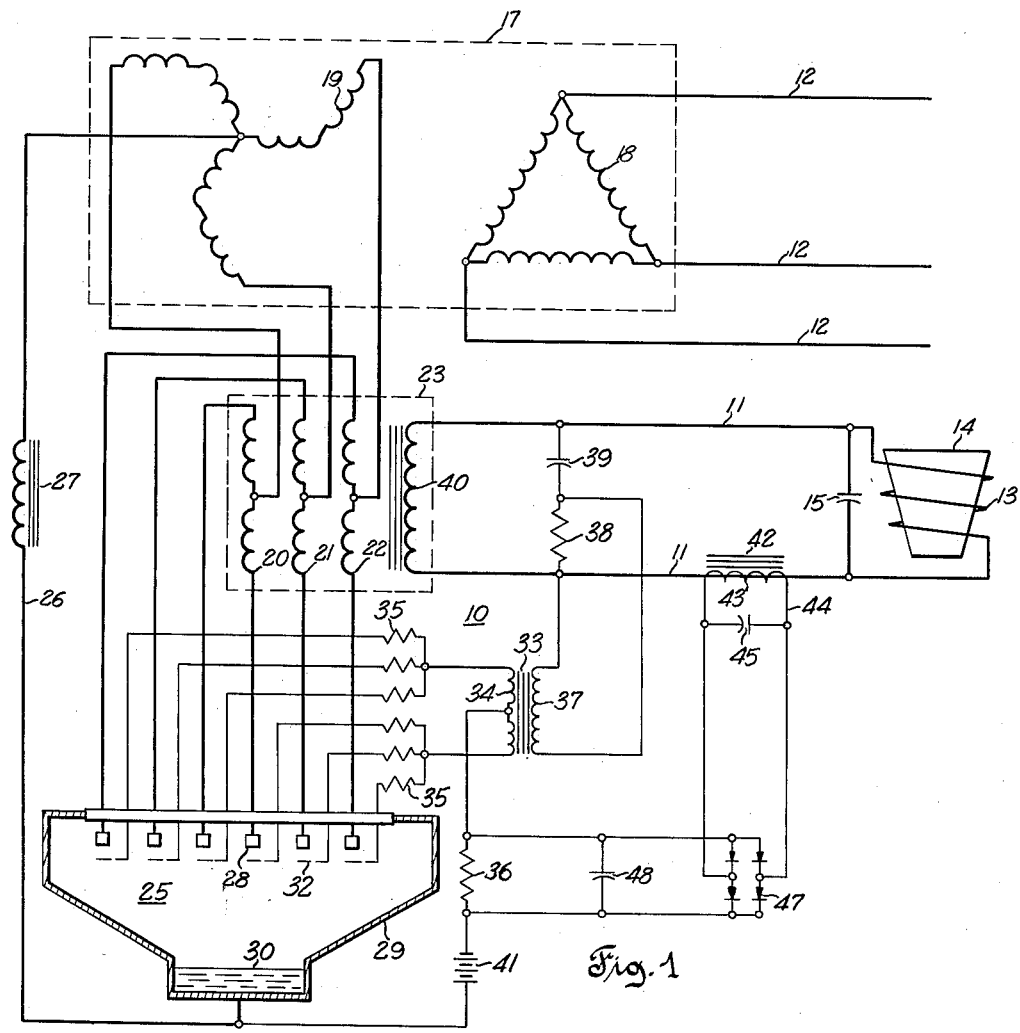
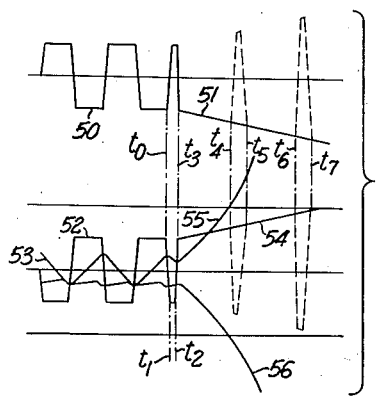
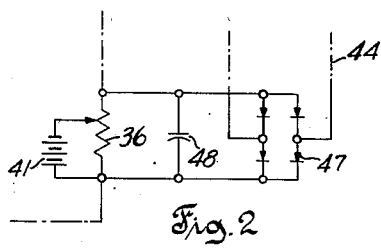
Inventor
Alfred J. Hansen
by John Stevens Lieb
Attorney Patented Feb. 26, 1952

2,587,151

UNITED STATES PATENT OFFICE 2,587,151

PROTECTIVE SYSTEM FOR ELECTRONIC FREQUENCY CHANGERS

Alfred J. Hansen, Wauwatosa, Wis., assignor to Allis-Chalmers Manufacturing Company, Milwaukee, Wis.

Application March 22, 1950, Serial No. 151,258

7 Claims. (Cl. 321—7)

This invention relates generally to means for controlling fault currents in electric valve converting systems and particularly to means for interrupting the flow of fault currents in self excited frequency changers comprising electric valves of the discontinuously controllable type.

In electronic frequency changers of this class, alternating current of a commercial frequency such as 60 cycles is converted into direct current which itself is then inverted into alternating current generally of a higher frequency such as 1000 cycles. This kind of frequency changer is useful in supplying high frequency current to induction furnaces of the coreless type which because they heat the furnace charge by inducing eddy currents require frequencies of between 1000 and 3000 cycles for most effective heating.

Since a self-excited frequency changer using suitable vapor tubes acts both as a rectifying device and as a power inverter it must be protected from fault currents which occasionally flow in such devices. The flow of fault current occurs when one of the valves conducts current in the forward direction during its scheduled nonconducting period. In the frequency changer such a flow of fault current is known as an arc-through.

Since an arc-through represents an unwanted short circuit current which may rise to dangerously high values if it flows for too long an interval, it is necessary not only to limit the rate of rise of the fault current but also to interrupt its flow as soon as possible after it begins. The rate of rise of such current is largely influenced by the value of the reactance in the direct current circuit. Because the amount of reactance that can be inserted in the direct current circuit for delaying the rise of the fault current is limited by practical considerations, the means provided for interrupting the fault current must react immediately to the initiation of the fault regardless of the rate of rise of the current and yet fail to react to load fluctuations when the frequency changer is operating normally.

Fortunately a self-excited frequency changer exhibits a certain electrical characteristic upon the initiation of a fault which allows for a fault control means to discriminate between a fault current and an increased load current. In the case of a fault, the appearance of an arc-through in a valve is reflected in the high frequency load circuit by a change in the current from alternating to substantially unidirectional. By integrating a measure of this unidirectional current, a potential may be derived which can be polarized and applied to the control electrodes to block the valves, thereby interrupting the fault current. A fault control means operating in this manner is thus immediately sensitive to a change in the kind of current flowing in the load circuit.

It is therefore an object of the present invention to provide an improved protective system for an electric valve frequency changer which can immediately discriminate between a fault current and an increased load current.

Another object of the invention is to provide an improved protective system for an electric valve frequency changer which can apply a blocking potential within an extremely short interval of time following a fault.

Another object of the invention is to provide an improved protective system which is capable of applying a blocking potential regardless of whether a fault is initiated in the positive or negative half cycle of the high frequency current.

Another object of the invention is to provide an improved protective system for an electric valve frequency changer which acts independently of the rate of rise of fault current.

Another object of the invention is to provide an improved protective system for an electric valve frequency changer which can continue to apply a blocking potential for a predetermined period after the fault current is interrupted.

Another object of the invention is to provide an improved protective system for an electric valve frequency changer which avoids the use of electronic or mechanical relays.

Objects and advantages other than those above set forth will be apparent from the following description when read with the accompanying drawing, in which:

Fig. 1 illustrates schematically one embodiment of the present invention consisting of a frequency changer for converting low frequency current in a supply circuit into high frequency current in a load circuit in which fault control means is coupled with the load circuit for blocking the control electrodes of the frequency changer;

Fig. 2 illustrates schematically a portion of another embodiment of the present invention in which the control electrode bias voltage may be applied across the whole or part of a grid bias resistor; and Fig. 3 illustrates schematically the wave forms of various voltages and currents in the system before and after the occurrence of a fault.

In Fig. 1, a frequency changer 10 is shown connected between a single phase load circuit 11 and a three phase supply circuit 12 which is energized from a suitable power source (not shown). The frequency changer 10 operates to convert an alternating current in the supply circuit 12, which current is of a relatively low frequency such as 60 cycles per second, into an alternating current of relatively high frequency such as 1000 cycles per second in the load circuit 11. Although Fig. 1 depicts frequency changing between a three phase and a single phase system the frequency changer 10 lends itself to operation between any $n$-phase systems at any frequencies (where $n$ is equal to, or greater than 1), the upper conversion frequency being limited only by the deionization time of the valves.

The high frequency or load circuit 11 is shown feeding an inductor 13 which surrounds the crucible 14 of a coreless induction furnace. A capacitor 15 is connected across the inductor 13 to give the combined load a capacitive character for supplying commutating current to the frequency changer 10. It will be apparent that the combination of capacitor 15 and inductor 13 provides an oscillatory load.

The frequency changer 10 comprises an input or low frequency rectifier transformer 17 having a delta connected alternating current winding 18 fed by the supply circuit 12 and a zigzag connected direct current winding 19 for canceling out the magnetizing effect on the transformer core when direct currents flow through the winding. However any type of transformer connection which will give the desired result may be employed, such as a Y-Y with a closed delta tertiary.

The terminals of the zigzag winding 19 are severally connected with sections of direct current windings 20, 21, 22 of an output or high frequency inverter transformer 23 through midtaps. The terminals of the sections of the direct current windings 20, 21, 22 in turn are connected, through a plurality of electric valves 25 of the discontinuously controllable type, with the neutral point of the zigzag winding to form the direct current circuit 26 of the frequency changer 10. A reactor 27 is inserted in this circuit for smoothing the voltage and for limiting the rate of rise of fault current should a fault occur.

The electric valves 25 have the usual anodes 28 which may be arranged, as shown, in a single casing 29 having a single cathode 30 of liquid metal such as mercury. As an alternative construction the anodes may be arranged in individual casings, each with a separate cathode. In either arrangement ignition means (not shown) is provided for initiating and sustaining electron emissivity from the cathode.

The conductivity of the electric valves 25 is controlled by means of suitable control electrodes 32 which may be grids if the continuously emissive type of cathode is used. When grids are provided the density of ionization in the region of the anodes is controlled by the grids during the scheduled nonconducting periods so as to prevent conduction during that period. Although Fig. 1 shows only one grid associated with each anode additional grids may be provided if desired.

The grids 32 may be energized in two groups of three from a suitable grid transformer 33 having its secondary winding 34 connected to the grids through current limiting resistors 35 of such low ohmic value as not to materially impede the flow of inverse current in the grid circuits. The resistors also function to equalize the currents between grids 32. The grid transformer 33 has its primary winding 37 connected across a resistor 38 of a phase shift circuit; the phase shift circuit comprising the same resistor 38 and a capacitor 39 serially connected across the alternating current winding 40 of the inverter transformer 23.

Bias voltage for the grids 32 is furnished from a suitable source of direct current such as a battery 41 having one terminal connected to the cathode 30 and the other terminal connected through a resistor 36 to a midtap of the secondary winding 34 of the grid transformer 33.

Means for controlling fault currents in the frequency changer comprises a current transformer 42 having a primary winding connected in series with the high frequency circuit 11 and a secondary winding 43 connected to a burden circuit 44 comprising a capacitor 45 bridging the secondary winding 43. The terminals of the capacitor 45 are diametrically connected to one pair of terminals of a double way rectifier bridge 47 and the other pair of terminals of the rectifier 47 are connected across the resistor 36 in the grid bias circuit. A smoothing capacitor 48 is connected in parallel with the resistor 36 to complete the burden circuit 44.

In order to start the frequency changer 10 some means such as that described in U. S. Patent No. 2,433,563, Johnson, December 30, 1947, or other suitable starting means (not shown) must be provided.

Once the frequency changer 10 has started it must operate with a leading power factor. Reactor 27 causes the current in the high frequency load circuit to have a substantially flat top wave. The form of this alternating current wave under normal conditions is schematically shown at 50 in Fig. 3. In operation the direct current flowing in circuit 26 is conducted by each phase of the rectifier transformer direct current winding 19 during approximately one-third of a cycle of the low frequency voltage. During that interval, a section of the inverter transformer direct current winding and the two electric valves connected therewith operate as a single phase inverter, and the current flows alternately through the two parts of the winding for half cycle periods of the high frequency voltage. The normal sequence of commutation or firing of the electric valves 25 is controlled by the proper application of voltage to the grids 32.

The control grids 32 thus determine the instants of arc ignition in the electric valves 25 for the normal sequence of commutation and prevent reignition of the arc at unscheduled periods in the anode voltage cycle.

However, occasionally a control grid 32 may fail to block an anode 28 during the scheduled nonconducting period. When such an event occurs the anode in question, which is at a higher potential than the anode which is to normally conduct current, either transfers the current to itself or continues to conduct current. The frequency changer is then said to experience an arc-through. Since the fault current through the unblocked anode is in the direction of the E. M. F. of the inverter transformer direct current winding, the flow of current is limited by the self-inductances of the circuit elements. Since these elements have relatively low self-inductances and since the fault may in all probability repeat itself in subsequent cycles it is desirable to interrupt the fault current as quickly as possible.

When the frequency changer is operating with alternating current of the wave form shown at 50 in Fig. 3 flowing in the high frequency circuit 11 through the primary winding of the current transformer 42, an alternating current of substantially similar wave form shown at 52 in Fig. 3, but reversed in sign, is reflected in the secondary circuit. A major portion of this secondary current is shunted through the capacitor 45 and results in a voltage drop across the capacitor.

The wave form of the alternating voltage appearing under normal conditions across the capacitor 45 is of triangular shape as schematically shown at 53 in Fig. 3. The value of this voltage, when rectified, is so adjusted, as compared with the value of the voltage drop appearing across the resistor 36 as a result of the flow of grid current and the action of the smoothing capacitor 48, that the alternating voltage does not affect the operation of the frequency changer 10 over the normal load range.

The differences in the two voltages is effected by adjusting the values of the resistor 36 and capacitor 45 so that the capacitor 45 has a relatively low impedance in contrast to the resistor's relatively high impedance. As a result, only a small part of the current transformer's secondary current passes through the rectifier bridge 47; the major portion of it is shunted through the capacitor 45 as hereinbefore mentioned.

As previously stated under normal conditions the alternating current in the high frequency load circuit generally has the wave form shown at 50 in Fig. 3. But under fault conditions this is no longer true. As a result of unblocking one of the anodes 28 which should have been blocked, the normal sequence of commutation between anodes is disrupted and the current flowing through the related section of the primary winding of the inverter transformer 23 is no longer alternating but unidirectional. This change in the kind of current flowing in the primary winding of the inverter transformer 23 will be reflected by a similar change in the kind of current flowing in the load circuit 11. If as shown in Fig. 3, a fault occurs at time $t_2$ following an apparently normal commutation from time $t_0$—$t_1$, then from time $t_3$ the load circuit line current 51 will become unidirectional, except possibly for short intervals such as $t_4$—$t_5$, $t_6$—$t_7$ in each following high frequency cycle when the current will reverse as shown in broken line in Fig. 3 if the other anode of the section is released. This reversal will only occur however if the grids have not yet blocked all idle anodes.

The effect on the current transformer 42 of the change of kind of current flowing in the primary winding (i. e. the change from alternating to unidirectional) is to cause a similar change in the kind of current flowing in the secondary winding 43. The secondary current, as shown at 54 in Fig. 3, will also become unidirectional. The voltage 55 appearing across the capacitor 45 during the flow of fault current is proportional to the product of the current 54 flowing through the capacitor 45 by the time of flow, and may be expressed symbolically as $k\int i\,dt$ where $k$ is a constant, $i$ is the current in amperes, and $t$ is the time in seconds. The polarity of this voltage will depend upon which anode of a section failed. Because the capacitor voltage 55 is proportional to the $\int i\,dt$ it will become apparent that the voltage 55 will increase as long as the unidirectional current 54 flows through the capacitor 45 regardless of whether this current is increasing or not. The function of the capacitor 45 is to integrate the current flowing through it so as to derive a voltage component 55 proportional to the integrated current. This voltage component 55 is then correctly polarized by means of the rectifier bridge 47 and applied as a negative voltage 56 between the control grids 32 and the cathode 30.

As the current in the frequency changer load circuit 11 continues to flow substantially in one direction, as shown at 51 in Fig. 3, the negative voltage component 56 continues to increase until its value exceeds the value of the voltage drop normally existing across the resistor 36, at which time it adds to the negative bias voltage component supplied by the battery 41. Within a few high frequency cycles the sum of the battery voltage component and the blocking voltage component 56 is sufficiently high to block all the idle anodes from further commutation and blocking is effected. If the following low frequency phase is successfully blocked the line current decreases and finally reaches zero. The rate of decrease depends upon the size of the direct current reactor 27.

As the fault current decreases, the blocking voltage component will also decrease. But before the blocking voltage component reaches too low a value to maintain the grids blocked the high frequency line voltage and hence the alternating component of the grid voltage is reduced to a value low enough to be overcome by the constant negative bias voltage component. This reduction is due to the load and natural damping in the load oscillatory circuit. The blocking is thus maintained even though the fault current of itself can no longer produce a blocking voltage.

An alternative way of connecting the source of bias voltage to the grid circuit is shown in Fig. 2, in which the battery 41 is connected across a portion of the resistor 36. This connection has the advantage of providing a minimum opposing voltage component which under normal operating conditions exceeds the value of the voltage component appearing at the output terminals of the rectifier bridge 47. When so connected the rectifier 47 is relieved from carrying current except under fault conditions. Furthermore the voltage normally appearing at the terminals of the capacitor 45 during the flow of high frequency current is not added to the grid bias component.

The smoothing capacitor 48 which is connected across the output terminals of the rectifier bridge 47 in Figs. 1 and 2 has the double function of smoothing out the ripple caused by possible commutations during the flow of fault current as shown in Fig. 3 at points $t_4$—$t_5$, $t_6$—$t_7$, and of maintaining the blocking voltage component for a predetermined period after the fault current has decreased to zero.

It will be understood from the foregoing description of the operation of the fault control means that the unidirectional currents and voltages referred to and depicted in Fig. 3 are transient phenomena which exist for a sufficient length of time to insure blocking of the valves of the frequency changer.

Although but two embodiments of the present invention have been illustrated and described, it will be apparent to those skilled in the art that various changes and modifications may be made therein without departing from the essence of the invention or from the scope of the appended claims.

It is claimed and desired to secure by Letters Patent:

1. In combination, an alternating current supply circuit, an alternating current load circuit, an oscillatory load connected to said load circuit, frequency converting means interconnecting said circuits comprising a plurality of electric valves having a plurality of control electrodes and at least one cathode, phase shifting means connected with said load circuit for impressing on each said electrode a control potential component to sustain oscillations in said load circuit, means for controlling the flow of fault current through said valve comprising means responsive to the flow of unidirectional current in said load circuit to impress on said control electrodes a unidirectional potential component to block the flow of fault current through said valves and means for sustaining a blocking potential component for a predetermined period following the cessation of flow of said fault current.

2. In combination, an alternating current supply circuit, an alternating current load circuit, an oscillatory load connected to said load circuit, frequency converting means interconnecting said circuits comprising a plurality of electric valves having a plurality of control electrodes and at least one cathode, phase shifting means connected with said load circuit for impressing on each said control electrode a periodic control potential component to sustain oscillations in said load circuit, and means responsive to the failure of said control electrodes to provide a normal sequence of commutation between said valves for blocking the flow of fault current through said valves, said means comprising a current transformer having a primary winding in series connection with said load circuit for carrying a unidirectional current upon the flow of fault current through said valves and having a secondary winding for carrying a unidirectional current upon the flow of said unidirectional current through said primary winding, a capacitor connected across said current transformer secondary winding for providing a unidirectional voltage component which is a function of the amplitude of said unidirectional current flowing in said secondary winding and the time of flow of said current, and means for applying said voltage component between said control electrodes and said cathode to block said valves.

3. In combination, an alternating current supply circuit, an alternating current load circuit, an oscillatory load connected to said load circuit, frequency converting means interconnecting said circuits comprising a plurality of electric valves having a plurality of control electrodes and at least one cathode, phase shifting means connected with said load circuit for impressing on each said control electrode a periodic control potential component to sustain oscillations in said load circuit, and means responsive to the failure of said control electrodes to provide a normal sequence of commutation between said valves for blocking the flow of fault current through said valves, said means comprising a current transformer having a primary winding in series connection with said load circuit for carrying a unidirectional current upon the flow of fault current through said valves and having a secondary winding for carrying a unidirectional current upon the flow of said unidirectional current through said primary winding, means for integrating the unidirectional current flowing through said secondary winding including means for producing a voltage component proportional to the integrated unidirectional current, and means for applying said voltage component between said control electrodes and said cathode to block said valves.

4. In combination, an alternating current supply circuit, an alternating current load circuit, an oscillatory load connected to said load circuit, frequency converting means interconnecting said circuits comprising a plurality of electric valves having a plurality of control electrodes and at least one cathode, phase shifting means connected with said load circuit for impressing on each said control electrode a periodic control potential component to sustain oscillations in said load circuit, and means responsive to the failure of said control electrodes to provide a normal sequence of commutation between said valves for blocking the flow of fault current through said valves, said means comprising means responsive to the flow of unidirectional current in said load circuit for providing a second unidirectional current, means for integrating said second unidirectional current to produce a unidirectional voltage component proportional to the integrated unidirectional current, means for polarizing said unidirectional voltage component, and means for applying said polarized voltage component between said control electrodes and said cathode to block said valves.

5. In combination, an alternating current supply circuit, an alternating current load circuit, an oscillatory load connected to said load circuit, frequency converting means interconnecting said circuits comprising a plurality of electric valves having a plurality of control electrodes and at least one cathode, phase shifting means connected with said load circuit for impressing on each said control electrode a periodic control potential component to sustain oscillations in said load circuit, and means responsive to the failure of said control electrodes to provide a normal sequence of commutation between said valves for blocking the flow of fault current through said valves, said means comprising a current transformer having a primary winding in series connection with said load circuit for carrying a unidirectional current upon the flow of fault current through said valves and having a secondary winding for carrying unidirectional current when said unidirectional current is carried by said primary winding, a capacitor connected across said secondary winding for integrating said unidirectional current in said secondary winding to provide a voltage component which is a measure of said integrated unidirectional current, rectifier means connected to said capacitor for polarizing said unidirectional voltage component, and impedance means connected between said cathode and said electrodes across which said polarized voltage component is applied to block said valves.

6. In combination, an alternating current supply circuit, an alternating current load circuit, an oscillatory load connected to said load circuit, frequency converting means interconnecting said circuits comprising a plurality of electric valves having a plurality of control electrodes and at least one cathode, phase shifting means connected with said load circuit for impressing on each said control electrode a periodic control potential component to sustain oscillations in said load circuit, and means responsive to the failure of said control electrodes to provide a normal sequence of commutation between said valves for blocking the flow of fault current through said valves, said means comprising a current transformer having a primary winding in series connection with said load circuit for carrying a unidirectional current upon the flow of fault current through said valves and having a secondary winding for carrying a unidirectional current as a result of the flow of said unidirectional current through said primary winding, a capacitor connected across said secondary winding for integrating said unidirectional current in said secondary winding to give rise to a voltage component which is a measure of said integrated unidirectional current, rectifier means connected to said capacitor for polarizing said unidirectional voltage component, impedance means connected between said cathode and said electrodes across which said polarized voltage component is applied to block said valves, and a second capacitor connected across said resistor for sustaining a blocking voltage component between said cathode and said electrodes for a predetermined period after said fault current becomes zero.

7. In combination, an alternating current supply circuit, an alternating current load circuit, an oscillatory load connected to said load circuit, frequency converting means interconnecting said circuits comprising a plurality of electric valves having a plurality of control electrodes and at least one cathode, phase shifting means connected with said load circuit for impressing on each said control electrode a control potential component to sustain oscillations in said load circuit, and fault control means comprising a current transformer having a burden of capacitive character, said fault control means being connected with said load circuit and said control electrodes and being responsive to a change in the character of the load current from an alternating current to a unidirectional current for impressing on said control electrodes a further control potential component for interrupting the flow of fault current through said valves.

ALFRED J. HANSEN.

REFERENCES CITED

The following references are of record in the file of this patent:

UNITED STATES PATENTS

| Number | Name | Date |
|---|---|---|
| 2,201,873 | Verse | May 21, 1940 |
| 2,376,808 | Ratz | May 22, 1945 |
| 2,394,084 | Livingston | Feb. 5, 1946 |
| 2,394,087 | Mahoney | Feb. 5, 1946 |
| 2,433,563 | Johnson | Dec. 30, 1947 |
| 2,473,344 | McCown | June 14, 1949 |
| 2,490,290 | Winograd | Dec. 6, 1949 |